Patented Oct. 25, 1932

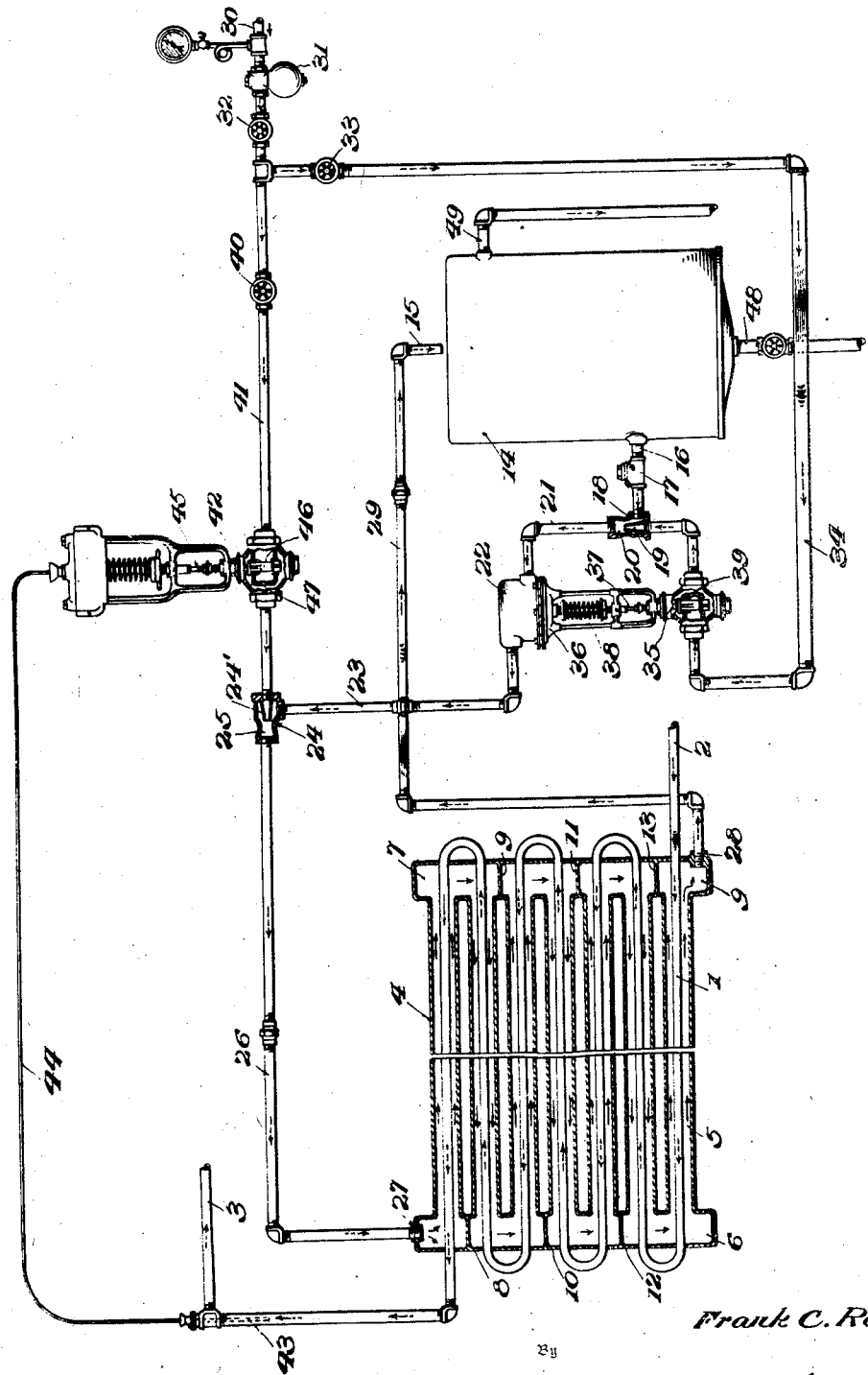

1,884,231

UNITED STATES PATENT OFFICE

FRANK C. REEDER, OF KNOXVILLE, TENNESSEE, ASSIGNOR TO THE FULTON SYLPHON COMPANY, OF KNOXVILLE, TENNESSEE, A CORPORATION OF DELAWARE

APPARATUS FOR PASTEURIZATION

Application filed May 28, 1928. Serial No. 281,244.

This invention relates to an improved apparatus for pasteurizing liquids, and more specifically for heating the liquids to be treated to the pasteurizing temperatures. The method herein disclosed is made the subject of a separate but divisional application filed August 4, 1930, Serial No. 472,982.

It is well known that the process of pasteurization depends for its success on a rapid and uniform treating of the liquid to be pasteurized, with an accurate control of the pasteurizing temperature in order to secure sterilization without producing undesired changes in the character of the treated liquids.

One system which has been used for this purpose involves passing the milk or other liquid to be sterilized through a coil of pipe within a water jacket, flowing hot water through the jacket by means of a circulating pump, and maintaining the temperature and flow of the water and the flow of the liquid in such relation that the liquid, in passing through the coil, will be raised to the desired temperature. In practice, however, it has been found extremely difficult to maintain the proper relationship of the variable factors of the system, with the result that the product has not been uniform, and has been subjected to incomplete sterilization due to low temperature, or impairment of its quality due to high temperature.

One object of this invention therefore is to provide an apparatus for pasteurizing liquids embodying an improved method of heat control whereby the temperature of the liquid to be pasteurized is quickly raised to the desired point and accurately maintained in spite of variation in the rate of flow of the liquid.

More specifically, this invention comprises a heat control for pasteurization involving the raising of the temperature of the heating liquid in two stages, the first stage being designed to maintain the heating liquid at a constant temperature somewhat below the pasteurizing temperature, and the second stage adding sufficient heat to maintain the liquid to be sterilized at the desired temperature.

Another object of this invention is to provide a pasteurizing heater which is efficient and reliable in operation and which is capable of precise automatic regulation.

Another object is to provide a pasteurizing heater of the circulating liquid type in which the temperature of the heating liquids is automatically controlled by the temperature of the liquids heated thereby.

Another object is to provide such a pasteurizing heater in which the heating liquid is forcibly circulated without the use of moving mechanical parts.

Other objects and advantages of the invention will appear from the following description, taken in connection with the appended drawing, in which the preferred embodiment of the invention is illustrated diagrammatically in elevation.

In the drawing there is illustrated a heat exchanger of any suitable construction, including a suitable heating coil 1 for the liquids to be pasteurized, shown as comprising a plurality of parallel sections connected by return bends, and having an inlet 2 and an outlet 3. The heating coil is surrounded by a water jacket 4 comprising parallel tubes 5, each of which surrounds a section of the heating coil, and headers 6 and 7 in which the ends of the tubes 5 are fixed in any suitable manner. The headers 6 and 7 are provided with staggered partitions 8, 9, 10, 11, 12, 13, etc., so arranged that the heating liquid is caused to flow through all the tubes 5 in series.

A reservoir 14 is provided for the heating liquid and has an inlet 15, outlet 16, drain 48 and overflow 49. Heating liquid from the reservoir passes through the outlet 16 and check valve 17 to the steam injector 18 comprising jet 19 and Venturi chamber 20. From thence the liquid flows through conduit 21, thermostat chamber 22, and conduit 23 to the second steam injector 24 which comprises jet 24' and Venturi chamber 25. From the second injector the fluid flows through conduit 26 to the inlet 27 of the water jacket 4. The heating fluid then circulates back and forth through the tubes 5 of the water jacket, giving up its heat to the heating coil 1 therein, and flows from the outlet 28 through the conduit 29 back into the reservoir 14 through the inlet 15.

It will be noted that the return line 29 rises above the level of the top of the water jacket in order that the latter may always remain filled with the heating liquid.

Steam for operating the injector 18 is supplied from pipe 30 through strainer 31, hand valves 32 and 33, and conduit 34 to thermostatically-operated valve 35 which controls the flow of steam to the injector 18. This valve, as shown, is of the balanced-poppet type and is controlled by any suitable type of thermostat such as illustrated at 36. As there indicated, a thermostat in chamber 22 operates the valve stem 37 against the pressure of an adjustable spring 38 and closes the valve when the temperature of the liquid in the chamber 22 rises above a predetermined degree. A small by-pass opening 39 is drilled in the web of the valve so that the thermostat cannot completely cut off the steam from the injector 18, sufficient steam being admitted at all times to secure the necessary circulation of the heating liquid. It will thus be seen that the injector 18 provides a continuous flow of heating liquid at a constant temperature.

The second injector is supplied with steam from pipe 30 through hand valves 32 and 40 and pipe 41 to the thermostatically-operated valve 42 controlling the flow of steam to nozzle 24'. The thermostat of this valve may also be of any suitable type, being shown as composed of a bulb 43, located in the outlet 3 of the coil 1, and connected by a small tube 44 to a flexible, expansible and collapsible chamber connected to the valve 42. The valve stem 45 is operated by the flexible chamber to control the valve 46 and admit just sufficient steam to the injector 24 to keep the fluid leaving the heating coil at the exact pasteurizing temperature.

The web of thermostat valve 42 is also provided with a by-pass opening 47 to admit sufficient steam to injector 24 to secure a continuous circulation of the heating liquid.

In operation the heating water system is filled to the level of the over-flow 49, and valves 32 and 33 are opened to admit steam to injector 18 for heating and circulating the water. Thermostat valve 35 is then adjusted to hold the temperature of the water passing through the chamber 22 at a fixed suitable degree, say 15 or 20 degrees below the temperature of pasteurization.

The milk or other liquid to be pasteurized is circulated through the heating coil 1 by a circulating pump or by gravity from a supply tank not shown. Valve 40 is then opened to admit steam to the second injector 24, and thermostat valve 42 is adjusted to hold the temperature of the milk in the outlet 3 exactly at the desired pasteurizing heat, which is usually set at 145 degrees F.

This method of heat regulation above set forth has been found to be especially well adapted to close control, in that the thermostatic controlling devices for the two heat sources are subject to different time lags, which brings about an automatic damping effect of one source on the other.

It will be understood that certain variations may be made in the apparatus herein disclosed without departing from the spirit of the invention, and it is therefore to be understood that the disclosure is to be considered as illustrative only, and not as limiting the invention defined by the appended claims.

What is claimed is:

1. In a pasteurizing apparatus, the combination with a heater for the liquid to be sterilized, of a circulating system for maintaining a supply of heating liquid for said heater, means for warming the heating liquid to a fixed temperature, and means for supplying additional heat thereto controlled by the temperature of the liquid to be sterilized, said means also acting to propel the liquid in said system.

2. In a continuous process pasteurizing apparatus, the combination with a heater for the liquid to be sterilized, of means for conducting heating liquid thereto, means for warming the heating liquid, said last named means also acting to propel the liquid in said system, controlling means therefor adapted to maintain the heating liquid at a fixed temperature below the pasteurizing temperature, and means for supplying additional heat thereto in accordance with the temperature of the liquid to be sterilized.

3. In a continuous process pasteurizing apparatus, the combination with a heater for the liquid to be sterilized, of means for conducting heating liquid thereto, means for warming the heating liquid to a fixed temperature below the temperature of pasteurization, said last named means also acting to propel the liquid in said system, means for supplying additional heat thereto, said last named means also acting to propel the liquid in said system, and means for controlling the additional heat supply in accordance with the temperature, as it leaves the heater, of the liquid to be sterilized.

4. In a pasteurizing apparatus, a system for circulating a heating liquid, and a pair of thermostatically controlled steam injectors arranged to simultaneously propel the liquid and apply measured quantities of heat thereto, one injector being controlled by the temperature of the heating liquid, and the other injector being controlled by the temperature of the liquid being pasteurized.

5. In a pasteurizing apparatus a system for circulating a heating liquid, a pair of steam injectors arranged in series for simultaneously propelling the liquid and applying measured amounts of heat thereto, valves for respectively controlling the admission of steam to said injectors, and thermostats operatively connected to said valves.

6. In a pasteurizing apparatus a system for circulating a heating liquid, and a pair of steam injectors arranged in series for simultaneously propelling the liquid and applying measured amounts of heat thereto, means for controlling the first injector to heat the liquid to a fixed temperature, and means for controlling the second injector to secure the fixed pasteurization temperature of the liquid to be sterilized.

7. In a pasteurizing apparatus, the combination with a heater for the liquid to be sterilized, of a circulating system for maintaining a supply of heating liquid for said heater, an injector arranged to admit a heated fluid to the system to heat and propel the liquid, a valve for controlling the injector, and a by-pass around the valve to maintain the circulation of the heating liquid.

8. In a pasteurizing apparatus, the combination of a heater for the liquid to be sterilized, of a circulating system for maintaining a supply of heating liquid for said heater, a plurality of injectors arranged to admit a heated fluid to the system to heat and propel the liquid in stages, and automatically operated valves for controlling the injectors.

9. In a pasteurizing apparatus, the combination of a heater for the liquid to be sterilized, of a circulating system for maintaining a supply of heating liquid for said heater, a plurality of injectors arranged to admit a heated fluid to the system to heat and propel the liquid in stages, valves for controlling the operation of the injectors, and a by-pass around each valve to constantly admit sufficient heated fluid to the injectors to maintain the circulation of the heating liquid.

10. In a pasteurizing apparatus, the combination with a heater for the liquid to be sterilized, of a circulating system for maintaining a supply of heating liquid for said heater, an injector arranged to admit a heated fluid to the system to heat and propel the liquid, a valve for controlling the injector, a thermostat for controlling the valve to cause the injector to raise the heating liquid to a predetermined temperature, and a by-pass around the valve to keep the injector operating sufficiently to maintain the circulation of the heating liquid.

11. In a pasteurizing system a heating coil for the liquid to be pasteurized, a water-jacket for heating the coil, a circulatory system for the heating water, means for raising the heating water to a fixed temperature below the pasteurizing temperature, and means for supplying additional heat thereto sufficient to raise the liquid to be pasteurized to the desired temperature, both said means acting also to propel the water through the system.

12. In a pasteurizing apparatus a system for circulating a heating liquid, a heat exchanger through which said liquid is circulated, a steam injector for heating and propelling the liquid, and a thermostat subjected to said liquid between said injector and said exchanger for controlling the steam to the injector in accordance with the temperature of the liquid leaving the injector.

13. A heating unit for a continuous flow pasteurizer comprising a heating coil, a water jacket therefor, a reservoir, a circulating system connected to the jacket and reservoir, a steam injector for heating and circulating the water, a thermostatically controlled valve for the injector which is controlled from the temperature of the heated water, and a by-pass around the valve for constantly admitting sufficient steam to the injector to maintain the circulation of the water.

14. A heating unit for a continuous flow pasteurizer comprising a heating coil, a water jacket therefor, a reservoir, a circulating system connected to the jacket and reservoir, a pair of steam injectors arranged to heat and circulate the heating water, and valves for controlling the admission of steam to the injectors, said valves being provided with by-passes to insure a sufficient flow of steam to maintain the circulation of the water.

15. A heating unit for a continuous flow pasteurizer comprising a heating coil, a water jacket therefor, a reservoir, a circulating system connected to the jacket and reservoir, a pair of thermostatically controlled steam injectors arranged to heat and circulate the heating water, the first injector being thermostatically controlled from the temperature of the water heated thereby, and the second injector being thermostatically controlled from the temperature of the liquid to be pasteurized, and means for constantly supplying sufficient steam to the injectors to maintain the circulation of the water.

16. In a pasteurizing apparatus, the combination with a heater for the liquid to be sterilized, of a circulating system for maintaining a supply of heating liquid for said heater, a plurality of injectors arranged to admit a heated fluid to the system to heat and propel the liquid, a valve for controlling each injector, a thermostat for controlling each valve to cause the injector to raise the heating liquid to a predetermined temperature, and a by-pass around each valve to keep the injector operating sufficiently to maintain the circulation of the heating liquid.

17. In a pasteurizing apparatus, a system for circulating a heating liquid, a plurality of steam injectors for heating and propelling the liquid, and a plurality of thermostats for controlling the steam to the injectors in accordance with the temperature in the system at different points.

In testimony whereof I have signed this specification.

FRANK C. REEDER.